3,458,488
COPOLYMERS OF CIS-1,4 BUTADIENE AND VINYL ETHERS AND THEIR PREPARATION
Edward William Duck and Michael Neil Thornber, Southampton, England, assignors to The International Synthetic Rubber Company Limited, Southampton, England, a corporation of the United Kingdom
No Drawing. Filed Oct. 24, 1966, Ser. No. 588,719
Claims priority, application Great Britain, Oct. 27, 1965, 45,534/65, Patent 1,091,115
Int. Cl. C08f 1/14, 3/02
U.S. Cl. 260—82.1      6 Claims

ABSTRACT OF THE DISCLOSURE

A copolymer of butadiene and a vinyl ether wherein the butadiene component is stereoregular with at least 90% cis-1,4 enchainment; also a method of preparing such a copolymer involving polymerization of the monomers in the presence of a three-component catalyst system consisting of (a) a nickel or cobalt complex of an alkylated hydroxy or thiol aromatic organic acid, (b) a boron trifluoride, and (c) an organic lithium alkyl, aryl, or alkylaryl.

---

This invention relates to copolymers of dienes and vinyl ethers and to the preparation of such copolymers.

Catalyst systems containing metal alkyl halides and transition metal compounds have long been known to produce stereospecific homopolymerisations of hydrocarbon monomers such as conjugated dienes. Where attempts are made to copolymerise two different monomers together this usually results in one or more of the following (a) complete inhibition of reaction, (b) much slower polymerisation, (c) much lower steric purity or (d) lower molecular weight. Only rarely does one achieve a stereospecific copolymer. Such stereospecific copolymers are usually of the alternate heteroblock type. With the type of catalyst system mentioned above monomers containing polar atoms or groups invariably interfere with the course of polymerisation, i.e. cases (a) or (b) above.

We have now found that certain 3-component catalysts will produce stereoregular copolymers of dienes and vinyl ethers. The importance of these products is that whilst the vinyl ether monomer may enter the polymer chain at random the diene maintains its stereoregularity, e.g. high cis-1,4 butadiene with vinyl isobutyl ether.

According to the present invention there is provided a copolymer of a diene and a vinyl ether, the diene monomer, as present in the copolymer, being stereoregular with preferably at least 90% cis-1,4 enchainment.

Also according to the present invention a stereoregular copolymer of a diene and a vinyl ether is prepared by copolymerising the monomers in the presence of a catalyst comprising:

(a) A nickel or cobalt complex compound of an alkylated hydroxy or thiol aromatic organic acid, e.g. diisopropyl salicylic acid in which the substituent hydrocarbon groups have one or more carbon atoms in each substituent group. The general formulae of such nickel or cobalt compounds would be as follows:

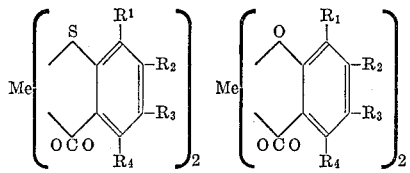

where Me=Ni or Co; $R_1$, $R_2$, $R_3$, and $R_4$ are alkyl groups or any one, two or three groups may be hydrogen.

(b) A boron fluoride complex, e.g. boron fluoride etherate ($BF_3Et_2O$) and $BF_3$ phenol complex.

(c) A lithium alkyl or aryl or alkylaryl.

Any aliphatic, aromatic or alkyl aromatic vinyl ether can be used, e.g. methyl vinyl ether, isobutyl vinyl ether, phenyl vinyl ether, benzyl vinyl ether.

Advantageously, from 0.1 to 30% w./w. vinyl ether is incorporated in the copolymer and the preferred amount is 1–20% w./w.

Variation in the vinyl ether component used and in the amount of vinyl ether employed allows one to make a great variation in the properties of the elastomer produced and thus the products can be tailored to suit almost any end use from tires to adhesives. The variation in the polar component also allows one to tailor the elastomer so that it is mutually compatible with many other polymers, plasticisers and other additives where the normal purely hydrocarbon rubbers are often notably poor.

Copolymerisation may be carried out at a temperature in the range —20° to 150° C., preferably at a temperature between 10–80° C. Any aliphatic or alicyclic hydrocarbon solvent may be used, e.g. hexane, iso-octane or cyclohexane.

The preferred order of addition of the catalyst components and the vinyl ether to the solution of butadiene in solvent is as follows:

(1) a small amount of component (c), the lithium alkyl, aryl or alkylaryl;
(2) component (a), the nickel or cobalt complex compound;
(3) component (b), the boron trifluoride complex;
(4) the remainder of the lithium alkyl, aryl or alkylaryl, component (c);
(5) vinyl ether.

The amount of lithium component added at stage 1 is only sufficient to react with the impurities in the solvent. The second portion, added at stage 4, initiates the polymerisation. The lithium component may, alternatively, be added in one batch, i.e. the order of addition would be (2), (3), (4), (5); in this case, polymerisation takes place more slowly.

The copolymers of the present invention are particularly valuable as elastomers. They possess many advantages over the diene homopolymers or purely hydrocarbon copolymers in that they exhibit improved processing characteristics, greater tack, better adhesion to polar surfaces and a high receptivity for white reinforcing agents. They can be sulphur cured in the conventional manner and the vulcanisates possess good physical properties.

The following examples serve to illustrate our invention.

EXAMPLE 1

In these examples, the preferred order of addition described above was used to scavenge impurities in the solvent.

To the 25 gms. of purified butadiene and 100 mls. of hexane (25% w.vol.) in the polymerisation bottle, was added butyl lithium (0.058 mM.) to react with residual water and oxygen in the system. This was followed by nickel di-iso-propyl salicylic acid (0.035 mM.) boron trifluoride etherate (0.35 mM.) and active butyl lithium (0.35 mM.) and finally 1.25 gms. (1.6 mls.) of pure isobutyl vinyl ether. The bottle was placed in a wire cage in a water bath maintained at 35° C. for 10 hours, and after this period the polymerisation was terminated with an antioxidant, Stavox. Coagulation with methanol, drying in the vacuum oven at 45° C. and weighing, indicated a percent conversion of monomers to polymer of 93%. The butadiene portion of the copolymer was substantially of the cis-1:4 configuration, i.e. 95.3% cis-1:4, 2.9% trans-1:4 and 1.8% vinyl-1:2. The intrinsic viscosity in benzene at 25° C. was 2.5. (.1% w./v. solution).

EXAMPLE 2

The procedure of Example 1 was followed with the replacement of the isobutyl vinyl ether with methyl vinyl ether (1.25 gms.). A copolymer of the vinyl ether and butadiene was obtained with the latter mainly in the cis-1:4 configuration with an intrinsic viscosity of 2.4.

EXAMPLE 3

The procedure of Example 1 was followed with the addition of the isobutyl vinyl ether to the butadiene/solvent mixture before the addition of the various catalyst components. This modified order of addition had no significant effect on the polymerisation or the structure and molecular weight of the final polymer.

EXAMPLE 4

0.067 millimoles of nickel bis-di-isopropyl salicylate was mixed together with 0.334 millimoles of boron fluoride etherate in hexane solvent. To this was added 0.3 millimoles of butyl lithium and 40 mls. butadiene monomer. The ratio of hexane to butadiene was 4:1. The presence of a solvent facilitated heat transfer and agitation, and this reaction mixture was allowed to react at 40° C. for a period of two hours in a reaction bottle. A sample of the contents of the reaction bottle was taken and added to alcohol to precipitate the polymer formed. It was calculated that the conversion of butadiene to polymer was 95%. The product showed an intrinsic viscosity in benzene at 25° C. of 2.4 and had the stereostructure 97.0% cis-1:4, 1.2% trans-1:4 and 1.8% 1:2-linkages. Isobutyl vinyl ether (1.25 gms.) was added to the high cis polybutadiene/solvent/catalyst residues in the reaction bottle and polymerised very rapidly to give a block copolymer with polyether and high cis polybutadiene blocks.

EXAMPLE 5

To 10 gm. of purified isobutyl vinyl ether in 100 mls. of hexane in the polymerisation bottle, was added butyl lithium (0.35 mM.). The bottle was placed in a wire cage in a water bath maintained at 30° C. for 10 hours. No polymerisation occurred.

EXAMPLE 6

The same procedure as in Example 5 was followed with the replacement of butyl lithium with boron trifluoride etherate (0.035 mM.). In this case a rapid polymerisation took place giving a very low molecular weight oil.

EXAMPLE 7

The procedure of Example 1 was followed using 10 gms. of purified isobutyl vinyl ether in 100 mls. of hexane with no butadiene present. In this case a rapid polymerisation took place giving rubber polymer of high molecular weight.

EXAMPLE 8

The procedure of Example 1 was followed except that 7.6 gm. of isobutyl vinyl ether (22% of monomer charge) was added. The conversion of monomers to polymer was 91% and the Mooney viscosity was 35. The microstructure of butadiene portion of the copolymer was not affected. The cis-1:4 content was 95.8%.

EXAMPLE 9

The procedure of Example 1 was followed using 2% isobutyl vinyl ether. Conversion of monomer to polymer was 97% and the Mooney viscosity was 37.

EXAMPLE 10

To the 25 gms. of purified butadiene and 100 mls. of hexane in the polymerisation bottle was added 1.25 gms. of isobutyl vinyl ether. This was followed by nickel di-isopropyl salicylic acid (0.035 mM.) and boron trifluoride etherate (0.35 mM.). The bottle was placed in a wire cage and suspended in a water-bath maintained at 35° C. for 14 hours. Only a small amount, 0.5 gm., of brown oil was obtained, which was found to be polyisobutyl vinyl ether.

Experimental verification of copolymer formation

We have conclusively proved that the product made according to procedures given in our examples is a genuine copolymer of a vinyl ether and butadiene and not simply a mixture of the two homopolymers, polyvinyl ether and polybutadiene.

(1) Extraction.—We submitted our product made with 15% isobutyl vinyl ether+85% butadiene to a continuous extraction with boiling acetone in an atmosphere of nitrogen. Samples of the solid material and evaporated extract were taken at various times and examined by infra-red spectroscopy for the isobutyl grouping and for C=C (butadiene residues).

As expected, the initial extracts contained some isobutyl groups with a small amount of butadiene residues. Pure polyisobutyl vinyl ether is very soluble in acetone whilst pure polybutadiene is insoluble. Our first extracts thus contained long blocks of isobutyl vinyl ether with smaller amounts of butadiene and thus behaved more like polyisobutyl vinyl ether.

This initial leaching lasted only over a period of 12 hours and after this time the solid polymer remaining contained 12% isobutyl vinyl ether residues. This did not decrease even after a further 3 weeks continuous extraction.

This experiment indicates that the compound is a copolymer and that the great majority of the isobutyl vinyl ether groups are randomly distributed along the chains.

(2) Dynamic mechanical response.—The dynamic mechanical response of the copolymer made with 10% w./w. isobutyl vinyl ether was measured at 200 c./s. over the temperature range —180° to 0° C. These experiments showed that (a) no isobutyl vinyl ether or butadiene monomers were present, (b) the isobutyl vinyl ether was randomly distributed along the chains and was not present as homopolymer.

No evidence of long blocks of isobutyl vinyl ether was adduced in this copolymer. However, when a further sample was prepared containing 25% w./w. isobutyl vinyl ether and 75% butadiene then there was evidence for the presence of blocks of isobutyl vinyl ether.

(3) Film casting.—A solution containing 75% of pure polybutadiene (over 95% cis-1,4) and 25% pure polyvinyl isobutyl ether in hexane was cast into a film by standing at .20° C. for 24 hours followed by a period of 24 hours at 50° C. Two separate layers were formed with wt. per unit area 3:1. The separate layers when analysed were (a) pure polybutadiene, (b) pure polyvinyl isobutyl ether. However, when the purified copolymer prepared from a monomer mixture containing 25% isobutyl vinyl ether and 75% butadiene was subjected to the same treatment no phase separation occurred. This experiment was repeated many times, always with the same result.

This third experiment also demonstrates quite clearly that the product is a true copolymer and not a simple mixture of homopolymers.

Compound and vulcanisation

Compounds of the copolymer containing 5% isobutyl vinyl ether were mixed to the following recipe:

| | |
|---|---|
| Intol 1712 | 68.75 |
| Polybutadiene/IBVE | 50.00 |
| ISAF black | 72.00 |
| Zinc oxide | 4.00 |
| Stearic acid | 1.50 |
| Dutrex R oil | 25.00 |
| Nonox ZA | 1.50 |
| Santocure | 1.00 |
| Sulphur | 2.00 |

Physical properties are given below:

| | |
|---|---|
| 100% modulus | p.s.i. 787 |
| 200% modulus | p.s.i. 573 |
| 300% modulus | p.s.i. 1058 |
| Tensile strength | 1784 |
| Elongation | 420 |
| Cure time | minutes 30 |
| Cure temperature | °C 144 |

A copolymer of butadiene with 4% vinyl isobutyl ether was compared with a standard commercially available high cis polybutadiene (Europrene Cis 4) for processing, compounding and vulcanisation characteristics. The results of this comparison are described below:

Mooney $ML_4$ at 100° C.:
    Butadiene vinyl isobutyl ether copolymer ---- 49.5
    Europrene Cis 4 ---- 49.5

"Europrene Cis 4" was chosen as the standard commercial sample of high cis polybutadiene because of its suitable Mooney viscosity. The cis content of this material was 94%.

Compounding and processing

The following compound was used:

| | |
|---|---|
| Polybutadiene or butadiene/vinyl isobutyl ether copolymer | 100 |
| ISAF black | 65 |
| Dutrex R oil | 30 |
| Zinc oxide | 4.0 |
| Stearic acid | 1.5 |
| Nonox ZA | 1.5 |
| Sulphur | 2.0 |
| Santocure | 1.0 |

The order of addition on an 18" x 9" Iddon laboratory mill set at friction speed (1:1.4) was as follows:

Polymer
Black
Oil
Stearic acid
Zinc oxide
Antioxidant
Sulphur and accelerator

COMMENTS ON MIXING

| | Commercial high cis polybutadiene | Butadiene/IBVE copolymer |
|---|---|---|
| Banding of polymer | Smooth sheet formed on cool rolls. | Smooth sheet formed on cool rolls. |
| Black addition | Consistent and fairly fast on warm roll. Easily manageable. | Slightly faster. Easily manageable. |
| Oil addition | Fast addition | Faster addition. |
| Rest of ingredients | Satisfactory | Satisfactory. |
| Refining | Refined thin (8 thou) when cool. | Refined thin more easily. Would refine at 8 thou even when rolls warm (120° F.). |

COMPOUNDED AND VULCANISED PROPERTIES

| | Europrene Cis 4 | Butadiene/vinyl isobutyl ether copolymer |
|---|---|---|
| Compound Mooney $ML_4$ at 100° C | 62.0 | 65.5 |
| Mooney Scorch 10 pt. rise at 114° C. (mins.) | 10.5' | 8.25' |
| Mooney Scorch 30 pt. rise at 144° C. (mins.) | 11.5' | 9.5' |
| RAPRA Curometer 95% cure at 144° C | 17.5' | 15.0' |
| Vulcanisation at 144° C | 17.5' | 15.0' |
| 100% Modulus, p.s.i | 233 | 245 |
| 200% Modulus, p.s.i | 508 | 605 |
| 300% Modulus, p.s.i | 973 | 1,195 |
| Tensile strength, p.s.i | 1,601 | 2,154 |
| Elongation at break, p.s.i | 410 | 460 |
| Tear strength, lb./in | 339 | 379 |
| IRHD | 59.0 | 61.5 |
| Resilience | 58.5 | 56.8 |
| Hysteresis loss, percent | 19.04 | 19.95 |

NOTE.—RAPRA is the Rubber and Plastics Research Association (Shawbury, England). IRHD is International Rubber Hardness Degrees.

Two copolymers, both containing 2.5% isobutyl vinyl ether and 97.5% butadiene were prepared in accordance with the present invention. The characteristics of vulcanisates, prepared in accordance with the recipe and procedure set out above, of these copolymers were compared with those of a vulcanisate of a commercially available polybutadiene rubber of Mooney viscosity $$ML_{1+4}^{212° F.} 35$$

containing approximately 45% cis-1,4-linkages, 47% trans-1,4 linkages and 8% 1,2-(vinyl) linkages ("low cis")

| | Copolymer | | Low cis polymer |
|---|---|---|---|
| | 1 | 2 | |
| Mooney ML 212° F. 1+4 | 26.0 | 28.5 | 33.0 |
| Compound ML 1+4 212° F. | 44.0 | 50.5 | 61.5 |
| Mooney Scorch: | | | |
|   MS 10 pt. rise at 144° C. (min.) | 2.5 | 3.25 | 2.25 |
|   MS 30-80 pt. rise at 144° C. (min.) | 0.5 | 0.5 | 0.5 |
| RAPRA Curometer at 144° C., (min.) 95% cure | 21 | 19 | 17.0 |
| 100% Modulus (p.s.i.) | 242 | 160 | 223 |
| 200% Modulus (p.s.i.) | 629 | 517 | 481 |
| 300% Modulus (p.s.i.) | 1,249 | 1,088 | 1,027 |
| Tensile at break (p.s.i.) | 2,105 | 2,424 | 2,032 |
| Elongation at break (percent) | 460 | 460 | 460 |
| Tear Strength (16/in.) | 35.8 | 45.0 | 29.9 |
| IRHD | 63.0 | 60.5 | 62.0 |
| Resilience | 53.8 | 49.5 | 47.5 |
| Ageing 7 days at 70° C.: | | | |
|   (a) Percent Tensile retained | 96 | 97 | 102 |
|   (b) Percent Elongation retained | 67 | 93 | 63 |

Comparative milling characteristics

The following uncompounded rubbers were compared.
(a) A commercially available polybutadiene rubber Mooney viscosity $$ML_{1+4}^{212° F.} 35$$

containing approximately 45% cis-1,4 linkages, 47% trans-1,4-linkages and 8% 1,2-(vinyl) linkages, hereinafter referred to as "low cis";

(b) A commercially available polybutadiene rubber of Mooney viscosity $$ML_{1+4}^{212° F.} 35$$

containing approximately 95% cis-1,4 linkages, 3% trans-1,4 linkages, and 2% 1,2-(vinyl) linkages, hereinafter referred to as "high cis"; and (c) A copolymer made from 97.5% butadiene and 2.5% isobutyl vinyl ether, Mooney viscosity $$ML_{1+4}^{212° F.} 35$$

prepared in accordance with the present invention.

The butadiene component of the copolymer was made up of approximately 96% cis-1,4 linkages, 2% trans-1,4 linkages and 2% 1,2-(vinyl) linkages. This copolymer is referred to hereinafter as "IBVE copolymer."

Conditions:
    Sample size ---- 1 lb.
    Mill type ---- 9"+18" Iddon lab. mill.
    Speed ---- Friction 1:1.4 front:back.

| | Time to form good band, free of laciness at given mill temperature | | | |
|---|---|---|---|---|
| Rubber | 70° F. | 110° F. | 150° F. | 210° F. |
| Low cis | — | — | — | 3 mins. |
| High cis | 3 mins. | 40 secs. | — | —. |
| IBVE Copolymer | <5 secs. | <5 secs. | <5 secs. | <5 secs. |

— indicates a good band did not form readily.

The figures clearly demonstrate the greatly improved processability of the new product over a wide temperature range.

Test of tack

"Tack" is the ability of the uncured, compounded or uncompounded, rubber to adhere to itself or to other materials such as textile fibres. In this example we have compared the self-adhesion of the new copolymer in the uncompounded state with that of other commercially available products. The rubbers used for comparison were those referred to in the example of "Milling Characteristics."

Condition.—Two pieces of the same rubber 1¼" x 12" were pressed together by a 1 kg. weight for 15 secs. The two pieces were then clamped vertically and separated by applying a 225 g. weight to one end of one piece.

Rubber: Time to separate
Low cis _____ 1 sec.
High cis _____ 1 min., 8 sec.
IBVE copolymer _____ 4 min., 43 sec.

This experiment clearly demonstrates the greatly increased tack of our new copolymer as compared with other polybutadiene-type rubbers.

What is claimed is:

1. A copolymer of butadiene and a vinyl ether, the butadiene monomer, as present in the copolymer, being stereoregular with at least 90% cis-1,4 enchainment.

2. A copolymer of butadiene and from 0.1 to 30% w./w. of a vinyl ether, the butadiene monomer, as present in the copolymer, being stereoregular with at least 90% cis-1,4 enchainment.

3. A copolymer of butadiene and from 1 to 20% of a vinyl ether selected from the group consisting of methyl vinyl ether, isobutyl vinyl ether, phenyl vinyl ether and benzyl vinyl ether, the butadiene monomer, as present in the copolymer, being stereoregular with at least 90% cis-1,4 enchainment.

4. A method of preparing a stereoregular copolymer of butadiene and a vinyl ether, comprising copolymerising the monomers in the presence of a catalyst consisting of (a) a nickel or cobalt complex compound of an alkylated hydroxy or thiol aromatic organic acid, in which the substituent hydrocarbon groups have one or more carbon atoms and preferably more than two carbon atoms in each constituent group, of the general formula:

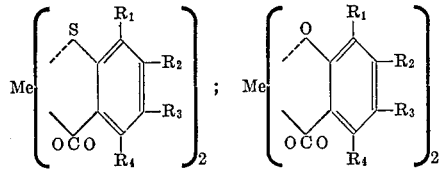

wherein Me is selected from the group consisting of nickel and cobalt, $R_1$, $R_2$, $R_3$, and $R_4$ are alkyl groups, up to three of these alkyl groups being replaceable by hydrogen atoms, (b) a boron trifluoride complex, and (c) an organic lithium compound selected from the group consisting of lithium alkyls, aryls and alkylaryls.

5. A method of preparing a stereoregular copolymer of butadiene according to claim 4, in which from 0.1 to 30% w./w. of a vinyl ether selected from the group consisting of methyl vinyl ether, isobutyl vinyl ether, phenyl vinyl ether and benzyl vinyl ether is incorporated in the copolymer and the copolymerisation is carried out at a temperature in the range −20° C. to +150° C.

6. A method of preparing a stereoregular polymer of butadiene and from 1 to 20% w./w. of a vinyl ether selected from the group consisting of methyl vinyl ether, isobutyl vinyl ether, phenyl vinyl ether and benzyl vinyl ether wherein the monomers are copolymerised, at a temperature in the range from 10 to 80° C., in the presence of a catalyst comprising nickel di-isopropyl salicylate, boron trifluoride etherate and butyl lithium.

References Cited

UNITED STATES PATENTS

| | | | |
|---|---|---|---|
| 2,914,515 | 11/1959 | Stuart | 260—88.2 |
| 3,023,198 | 2/1962 | Nowlin et al. | 260—88.1 |
| 3,067,189 | 12/1962 | Balas | 260—94.3 |
| 3,170,907 | 2/1965 | Neda et al. | 260—94.3 |
| 3,297,671 | 1/1967 | Natta et al. | 260—91.1 |

JOSEPH L. SCHOFER, Primary Examiner

J. C. HAIGHT, Assistant Examiner

U.S. Cl. X.R.
260—91.1, 94.3